United States Patent
Uchiyama et al.

(10) Patent No.: US 6,400,373 B1
(45) Date of Patent: Jun. 4, 2002

(54) IMAGE PROCESSING APPARATUS AND METHOD

(75) Inventors: Shinji Uchiyama, Yokohama; Akihiro Katayama, Yokosuka, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/943,699

(22) Filed: Oct. 3, 1997

(30) Foreign Application Priority Data

Oct. 7, 1996 (JP) .............................................. 8-265985

(51) Int. Cl.⁷ .............................................. G06T 11/60
(52) U.S. Cl. ........................ 345/629; 345/619; 345/630; 345/632
(58) Field of Search ................................ 345/418, 419, 345/425, 427, 433, 435, 629, 619, 632, 630

(56) References Cited

U.S. PATENT DOCUMENTS

| | | | |
|---|---|---|---|
| 4,970,666 A | * 11/1990 | Welsh et al. ................. | 345/423 |
| 5,490,239 A | * 2/1996 | Myers ......................... | 345/419 |
| 5,689,628 A | * 11/1997 | Robertson ................... | 345/427 |
| 5,850,352 A | * 12/1998 | Moezzi et al. ............... | 345/419 |

OTHER PUBLICATIONS

L. Blonde, et al., "A Virtual Studio For Live Broadcasting: The Mona Lisa Project", IEEE Multimedia, vol. 3, No. 2, Jun. 1996, pp. 18–28.

S. E. Chen, "Quicktime VR—An Image–Based Approach To Virtual Environment Navigation" Computer Graphics Proceedings, Los Angeles, Aug. 6–11, 1995, pp. 29–38.

* cited by examiner

Primary Examiner—Mark Zimmerman
Assistant Examiner—Kimbinh T. Nguyen
(74) Attorney, Agent, or Firm—Fitzpatrick, Cella, Harper & Scinto

(57) ABSTRACT

A virtual space using a geometric model for forming a virtual environment is input, nongeometric model object expression data based on a multi-viewpoint image is acquired, geometric information is added to the acquired nongeometric model object expression data, and the nongeometric model object expression data is used as an object arranged or operated in the virtual space using the added geometric information or automatically moving in the space. The same effect as that obtained when the shape data of an object having a very complex shape is generated or reproduced can be easily obtained without generating or reproducing the shape data. In addition, the entire virtual space can be generated without holding an enormous amount of light space data, so that the object can be operated in the three-dimensional space.

17 Claims, 16 Drawing Sheets

DEFINITION OF $(\phi, \psi)$

IN CASE OF ONLY SCAN LINE 1 IN X-AXIS DIRECTION

IN CASE OF ONLY SCAN LINE 1 IN X-AXIS DIRECTION (WHERE, $u = \tan \phi$)

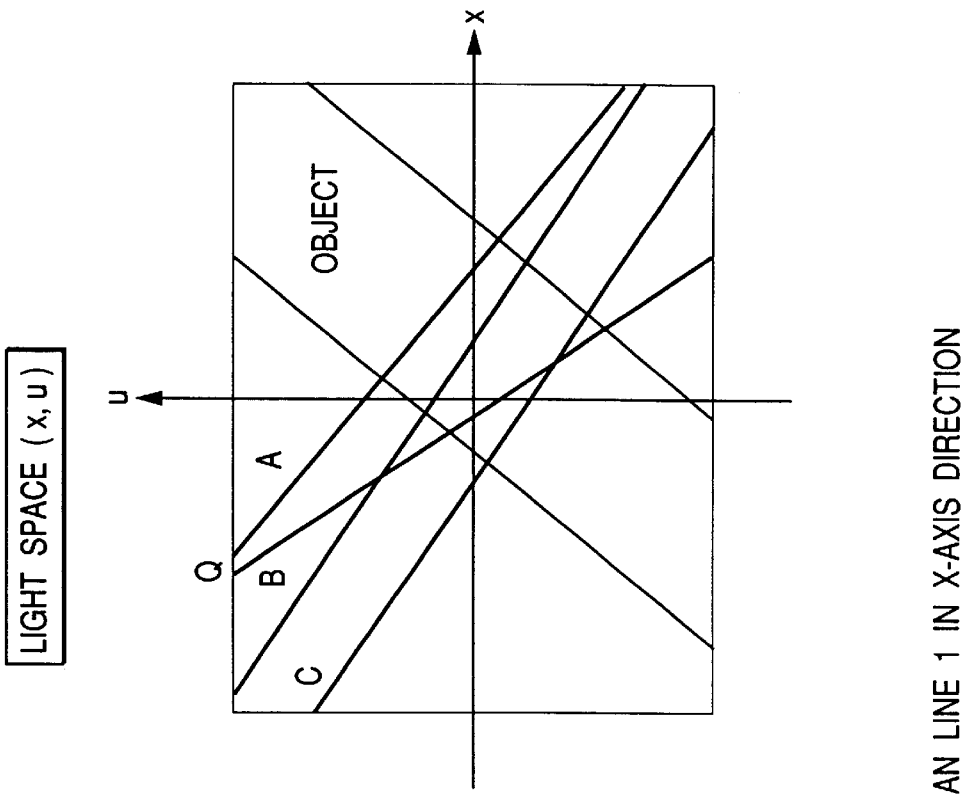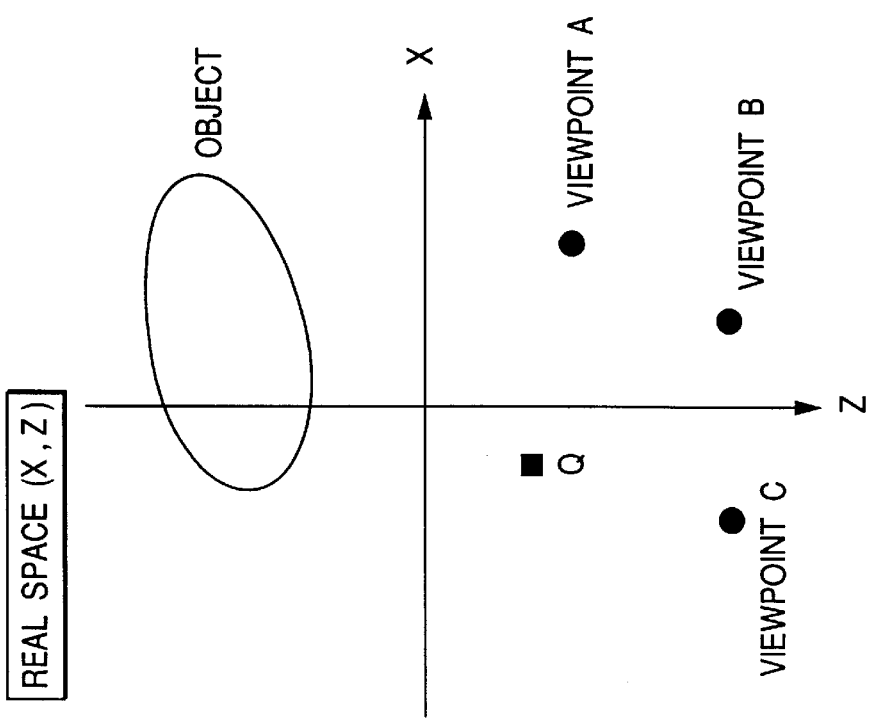
IN CASE OF ONLY SCAN LINE 1 IN X-AXIS DIRECTION

BASE S

BOUNDING BOX B

IMAGE PROCESSING APPARATUS AND METHOD

BACKGROUND OF THE INVENTION

1. Field of the Invention

The present invention relates to an image processing method and apparatus and a storage medium for generating a virtual environment which can be experienced by the operator.

2. Related Background Art

Techniques below are known to generate a virtual environment which can be experienced by the operator.

(1) A three-dimensional object or space is expressed by geometric model data such as polygon data or surface data, texture data representing surface characteristics or a pattern, light source data, and the like, and the appearance of a scene in an arbitrary direction is rendered using the computer graphics rendering technique, thereby expressing a three-dimensional object or space. With this technique, a virtual space is formed, and a virtual environment is generated and experienced.

(2) A number of image groups of a three-dimensional real object or a real space are photographed, and a target object or space is described on the basis of the image groups. The appearance of the target is recorded without reconstructing the shape information of the target (this method is called nongeometric modeling), thereby reproducing the appearance in an arbitrary direction. More specifically, a photographed image is converted into light space data, and an image viewed from an arbitrary direction is generated from the light space data and presented.

In prior art (1), the shape data of an object having a very complex shape can hardly be generated or reproduced. It is also hard to acquire shape data of an object having a complex shape from a real object using a three-dimensional measuring device. For this reason, the complex object can hardly be expressed. Particularly, it is more difficult to reproduce a real object having a certain complex shape or complex surface pattern/reflection characteristics (absorption/transmission characteristics). More exactly speaking, generally, a natural object can hardly be expressed although an artificial object can easily be expressed. However, a simple and artificial three-dimensional scene mainly constituted by planes, e.g., a room or a row of buildings can be relatively easily expressed using a relatively small quantity of data.

In prior art (2), once nongeometric model data is generated from a certain amount of photographed image data, an image observed from an arbitrary viewpoint (there are restriction conditions in fact) can be generated. However, to present images viewed from all positions of the three-dimensional scene, an enormous amount of light space data must be generated and held. For this reason, the entire virtual space can hardly be generated using this data. In addition, since the target is expressed without reconstructing the shape information, operations of arranging and translating/rotating of the object expressed by the data as an object having a three-dimensional spacial extent are limited.

Prior arts (1) and (2) are incompatible so the object expressed using nongeometric model data cannot be used in the virtual space generated by prior art (1). This is because although prior art (2) solves the problems of prior art (1), prior art (2) cannot be used to realize a virtual environment.

SUMMARY OF THE INVENTION

In order to solve the above problems, according to the present invention, there is provided an image processing method comprising:

the input step of inputting a virtual space using a geometric model for forming a virtual environment;

the acquisition step of acquiring nongeometric model object expression data based on a multi-viewpoint image;

the addition step of adding geometric information to the acquired nongeometric model object expression data;

the determination step of determining a relationship between the added geometric information and a coordinate system of the virtual space; and the operation step of performing a predetermined operation for the nongeometric model object expression data in the virtual space on the basis of the determined relationship.

In order to solve the above problems, according to the present invention, there is also provided an image processing apparatus comprising:

input means for inputting a virtual space using a geometric model for forming a virtual environment;

acquisition means for acquiring nongeometric model object expression data based on a multi-viewpoint image;

addition means for adding geometric information to the acquired nongeometric model object expression data;

determination means for determining a relationship between the added geometric information and a coordinate system of the virtual space; and operation means for performing a predetermined operation for the nongeometric model object expression data in the virtual space on the basis of the determined relationship.

In order to solve the above problems, according to the present invention, there is also provided a computer-readable storage medium which stores a computer program for realizing an image processing method comprising:

the input step of inputting a virtual space using a geometric model for forming a virtual environment;

the acquisition step of acquiring nongeometric model object expression data based on a multi-viewpoint image;

the addition step of adding geometric information to the acquired nongeometric model object expression data;

the determination step of determining a relationship between the added geometric information and a coordinate system of the virtual space; and the operation step of performing a predetermined operation for the nongeometric model object expression data in the virtual space on the basis of the determined relationship.

BRIEF DESCRIPTION OF THE DRAWINGS

FIGS. 14A and 14B are views showing transformation between the real space and the light space;

DETAILED DESCRIPTION OF THE PREFERRED EMBODIMENTS

[First Embodiment]

Figure 1:
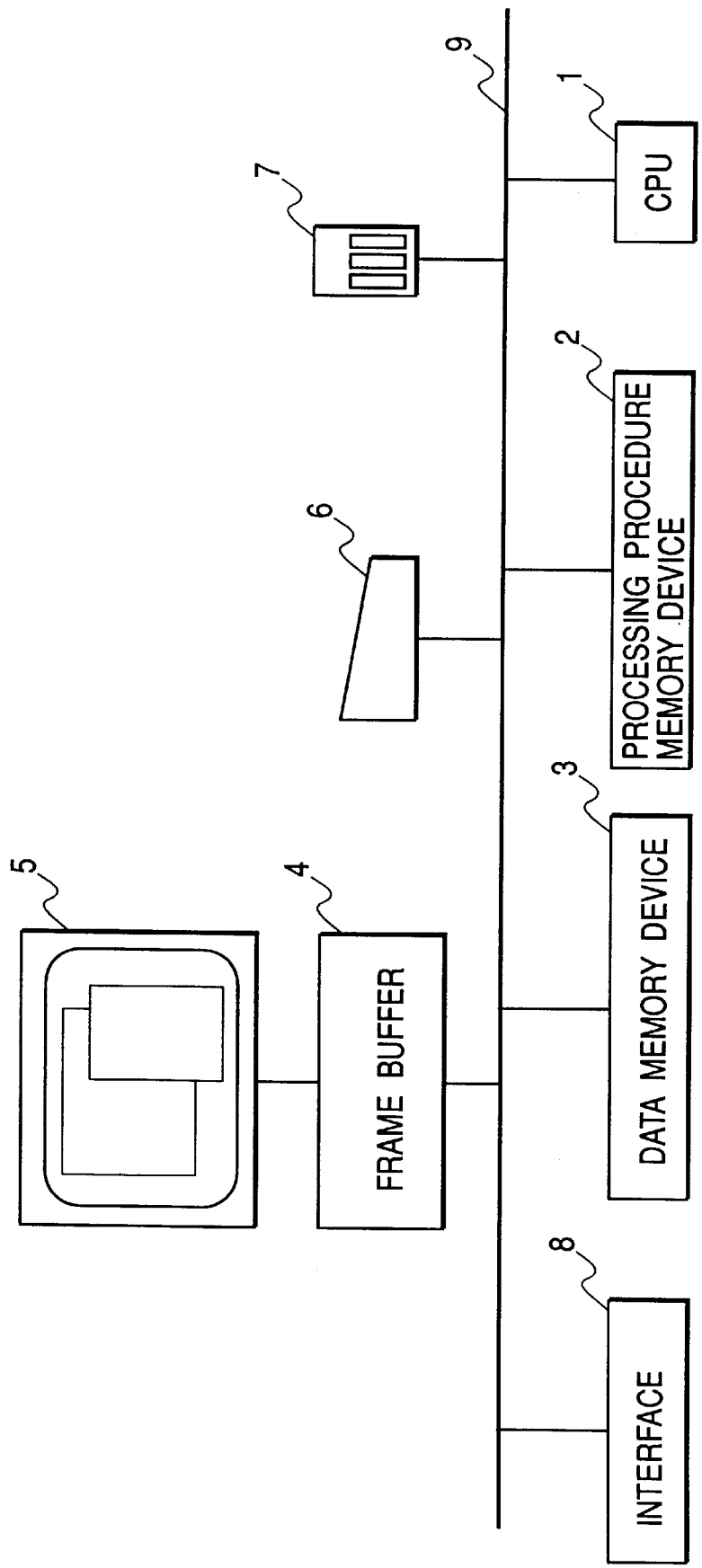
FIG. 1 is a block diagram of an apparatus for realizing the first, second, and third embodiments.

FIG. 1 is a block diagram of the first embodiment. A CPU 1 executes the processing procedure of the first embodiment. A processing procedure memory device 2 stores the processing procedure. The processing procedure may be stored in the processing procedure memory device 2 in advance, or stored in a storage medium such as an FD, a CD-ROM, a ROM, or a magnetic tape and supplied through an external device interface 8. A data memory device 3 holds data generated or input before/after processing and during processing. A frame buffer 4 stores image data for presenting the processing process or processing result, which is to be sent to a display device. A window system 5 of the image processing apparatus displays image data stored in the frame buffer 4. A keyboard 6 is used to input an instruction in the processing process. A mouse 7 is a pointing device for designating a position on the screen. The external device interface 8 is used to input/output data or processing procedure. These units are connected via a bus 9.

Figure 2:
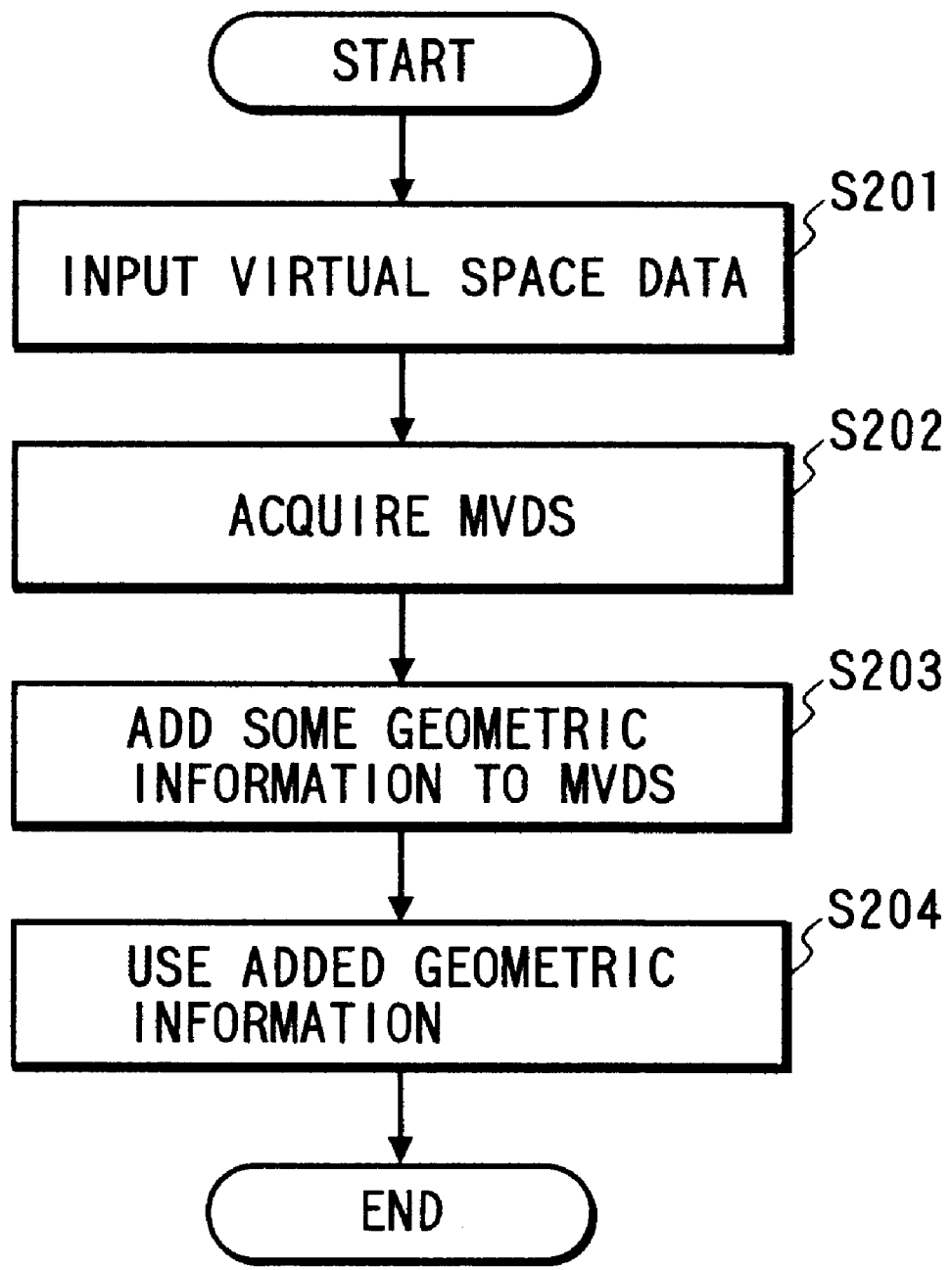
FIG. 2 is a flow chart of the first embodiment.

FIG. 2 is a flow chart showing the processing flow of the first embodiment. The first embodiment will be described in detail with reference to FIG. 2. In step S201, virtual space data using a geometric model for forming a virtual environment is input. To generate a virtual environment using a geometric model, internal objects, buildings, and background constituting the virtual space must be generated by, e.g., a modeler device capable of generating some computer graphics geometric data and surface characteristic data.

An existing technique can be used for this generation processing. A geometric model and surface characteristic data may be generated in step S201, or data generated in another processing may be loaded. The geometric data means polygon data such as a triangular patch or free surface data such as NURBS. The surface characteristic data represent the material, reflection characteristics, and pattern of the object. The pattern is input as texture data. The texture data represents the surface pattern of polygon data or free surface data. The texture data describes the correspondence between pattern image data and a target object to which the image data is to be pasted. In step S202, a nongeometric model object expression data set (to be referred to as an MVDS (Multi-Viewpoint Data System) hereinafter) based on a multi-viewpoint image is acquired.

With this method, the target object is expressed by describing the "appearance" of the object without estimating or measuring the shape of the object. The basic concept of this method will be described below.

Figure 15:
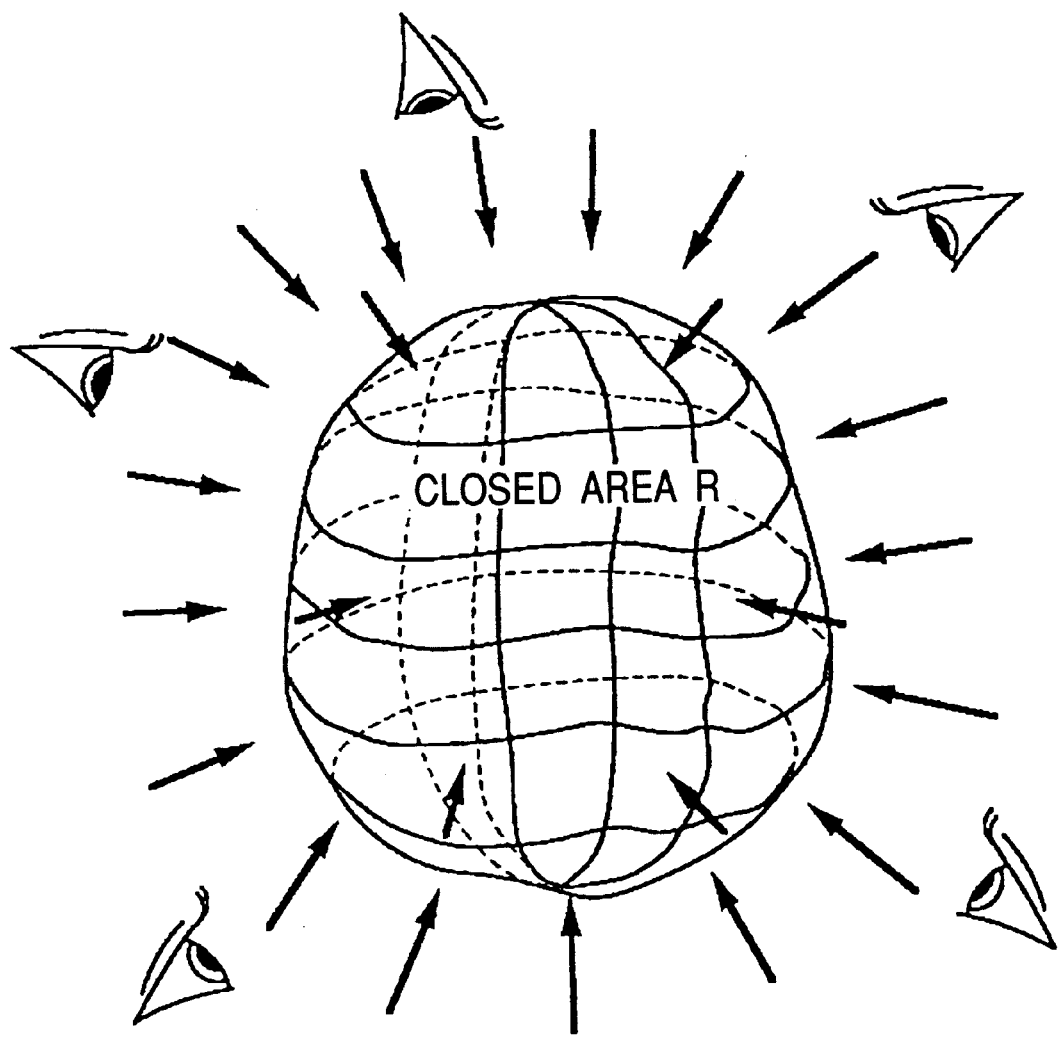
FIG. 15 is a schematic view showing a state wherein a closed area (space) to be observed is assumed in nongeometric model data.

The geometric model describes the target object by recording the shape information of the target object. However, the MVDS describes the target object by recording data for reconstructing various "appearances" without reconstructing or measuring the shape of the target object. More specifically, a number of images are photographed around the target object, and the appearance of the target object is described on the basis of the images. Observation need not be performed in correspondence with all viewpoints necessary in reconstructing the appearance on the basis of the description data. It is considered that the reconstructed image can be generated from a certain limited amount of observation data. The MVDS means data converted from such finite multi-viewpoint observation data to readily generate an image viewed from various viewpoints. The MVDS is acquired by recording a number of data (light emerging from an area) which can be observed as an image from an assumed area where the target object supposedly exists. For this reason, in the MVDS, a space (area where light emerges; this area will be referred to as a closed area (space) R hereinafter) where the target object is present is explicitly or implicitly assumed, as shown in FIG. 15. In addition, to input the MVDS, the camera arrangement in photographing must be known. More specifically, the relative positional relationship between the closed area R and the camera arrangement in photographing is known. In other words, the direction (coordinate axes) of the closed area R and the scaling factor are obtained from the geometric arrangement information of the camera in photographing.

The geometric arrangement information of the camera is obtained using a photographing device whose movement can be controlled, or determined on the basis of some image characteristic feature of the observed multi-viewpoint image. An image at an arbitrary viewpoint is reconstructed from the MVDS on the basis of the position and direction of a virtual camera viewed from the closed area R.

Figure 11A:
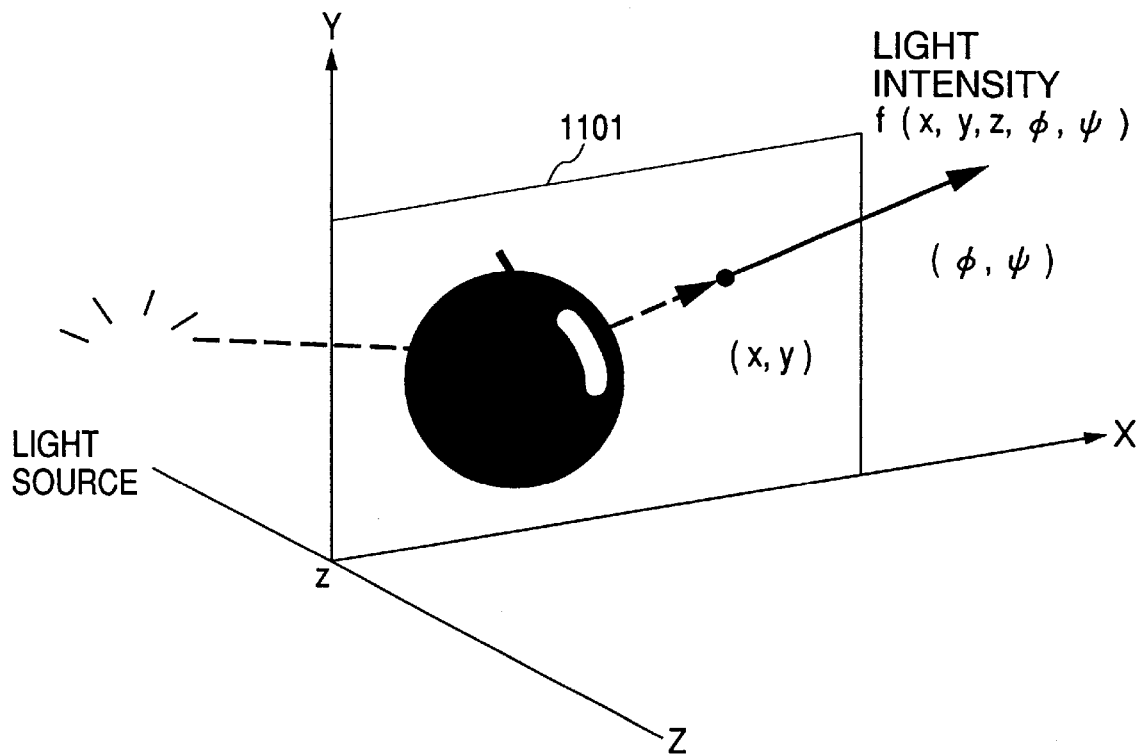
FIGS. 11A and 11B are schematic views showing a three-dimensional space so as to explain the principle of a light space.
Figure 11B:
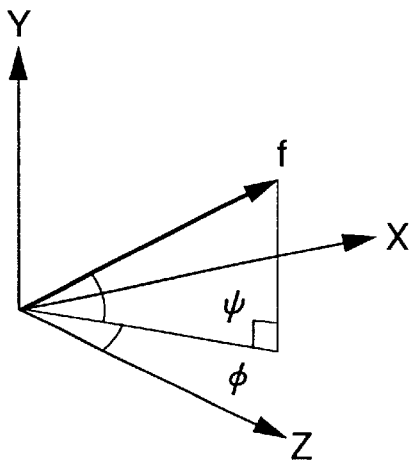
Figure 12:
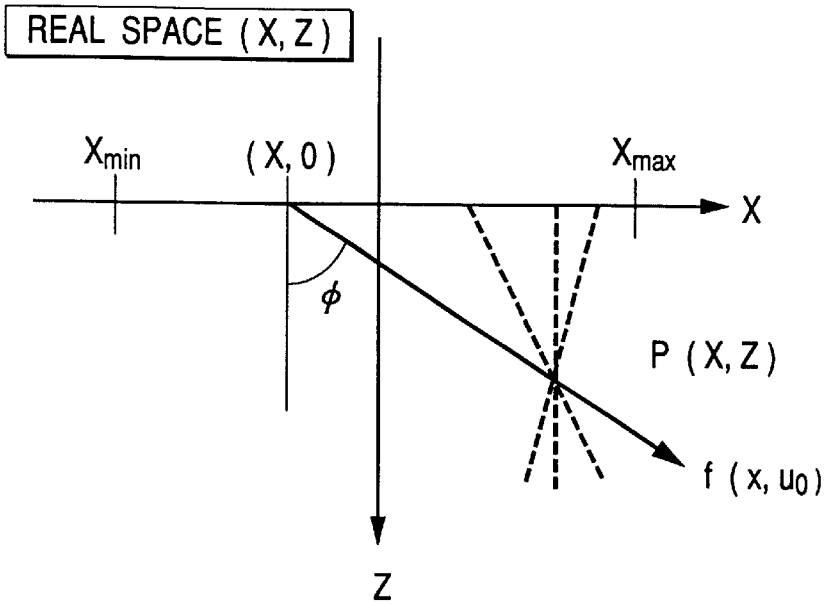
FIG. 12 is a view showing the relationship between a certain point in a real space and a light beam passing through the point.
Figure 13:
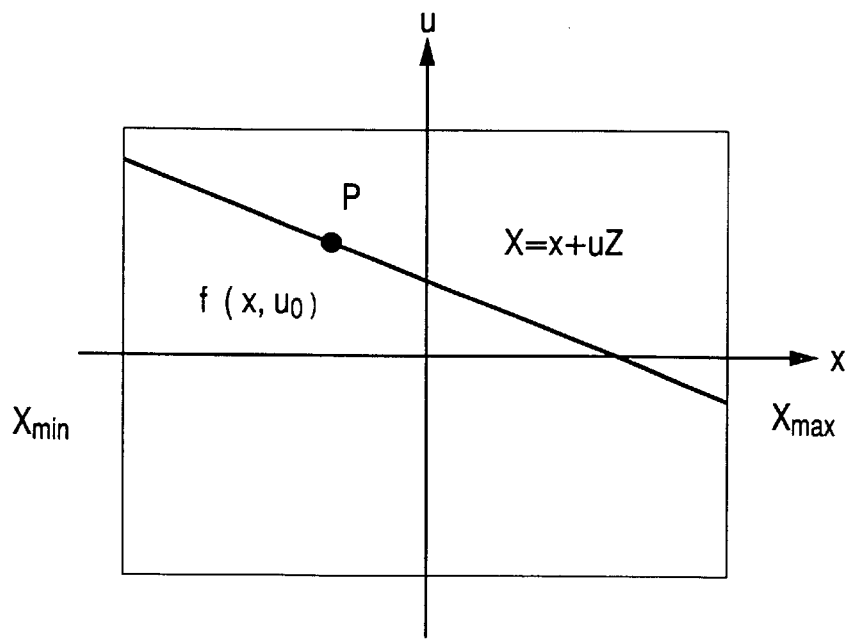
FIG. 13 is a view showing a map of a light beam passing through a certain point in the real space and projected on an x-u space as a light space.

As such an MVDS, light space data to be described below can be used. A technique of assuming a plane where z=0 on a coordinate system as shown in FIG. 11A and expressing a three-dimensional space as a set of light beams passing through this plane (to be referred to as a reference plane 1101 hereinafter) is proposed (three-dimensional space expression by light space). In this technique, an image which can be observed at a viewpoint P in the three-dimensional space where z>0 is equivalent to an image obtained by sampling only light beams passing through the viewpoint P from the set of the light beams passing through the reference plane 1101, as shown in FIG. 12. Generally, each light beam is represented by a position (x,y) through which the light beam passes, angles φ and Ψ (FIG. 11B) between the light beam and the X- and Y-axes, time t when the light beam has passed through the plane, and the color (r,g,b) of the light beam. In fact, to prevent the calculation amount or data amount from becoming enormous, it is assumed that the object is stationary and no Y-axis parallax is present. Under this assumption, each light beam is projected on the x-u space while setting u=tan φ, and the light space is handled in this projected x-u space. In this case, a light beam passing through the certain point P exhibits a straight locus as shown in FIG. 13. This locus is represented by the following equations:

$$x = X - Z \cdot u \quad (1)$$

$$u = \tan\phi \quad (2)$$

where (X,Z) is the observation viewpoint P, x is the position where the light beam crosses the X-axis in the x-u space, and φ is the angle formed between the light beam and the Z-axis.

First, straight loci are obtained from an image obtained at a number of viewpoints (e.g., viewpoints A, B, and C), as shown in FIGS. 14A and 14B, and assume that the x-u space is filled with this locus group at a high density. At this time, the image at a viewpoint Q where z>0 can be obtained by calculating a locus passing through the viewpoint Q on the x-u space, as shown in FIG. 14B, and reversely obtaining the color of the light beam which has already been recorded on the locus.

Figure 16:
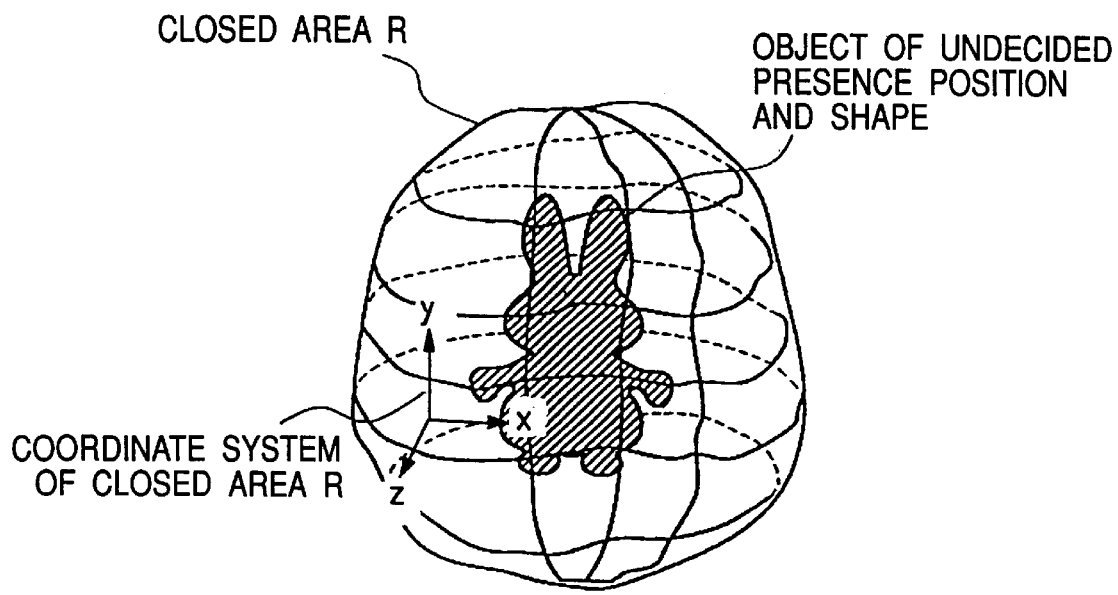
FIG. 16 is a schematic view of geometric information of an MVDS.

In step S203, some geometric information is added to the MVDS. This some geometric information will be described. The MVDS describes only the appearance of the object in the area R and does not explicitly describe the shape of the object. Only the assumed closed area R as shown in FIG. 16 is known as information of the three-dimensional space which is known from the MVDS. The presence position and shape of the object in the closed area R are undecided. To use the MVDS as an object in the virtual space, some geometric information for mixing the MVDS with the shape model input in step S201 is required. In this case, the some geometric information means three-dimensional information such as the three-dimensional position of a point, the direction of a vector, or a surface. In step S204, the MVDS is operated in the virtual space described by the three-dimensional shape information itself using the geometric information added in step S203. When the relationship (arrangement position or direction) between the geometric information added in step S203 and the coordinate system of the virtual space is described, the object expressed by the MVDS can be used in the virtual space.

Figure 3:
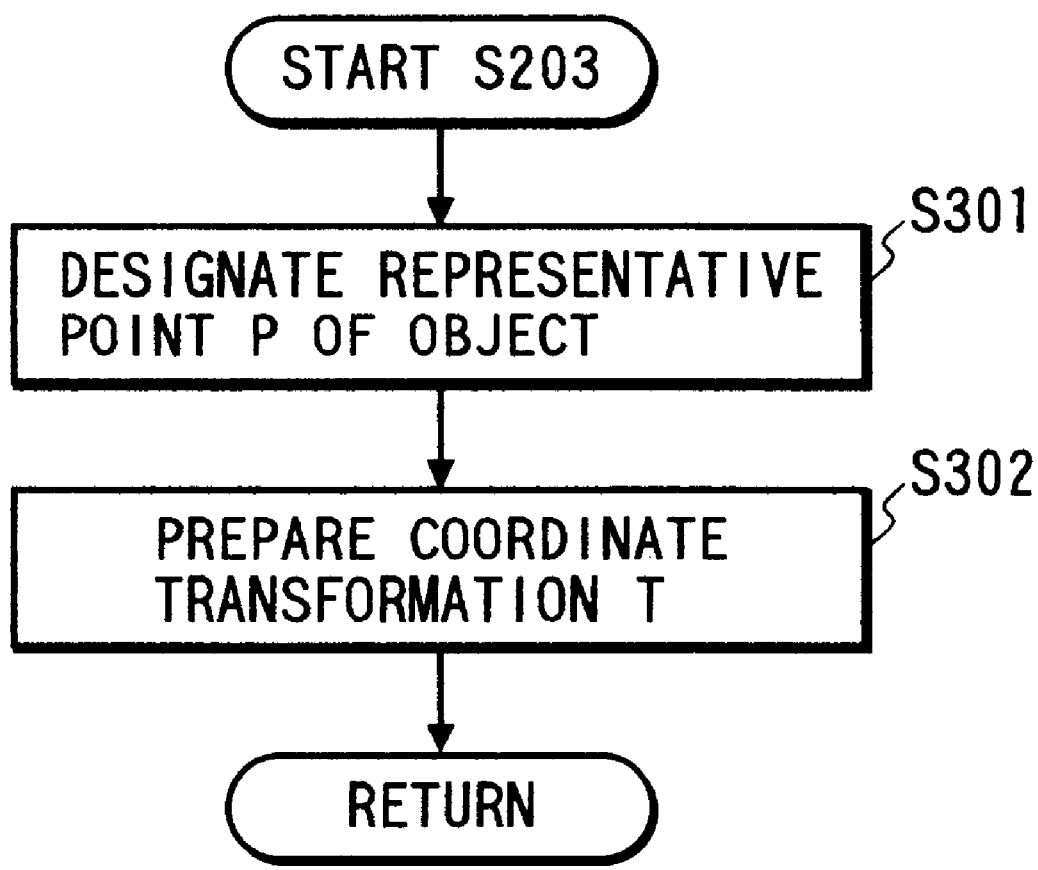
FIG. 3 is a flow chart showing part of the first embodiment.
Figure 4:
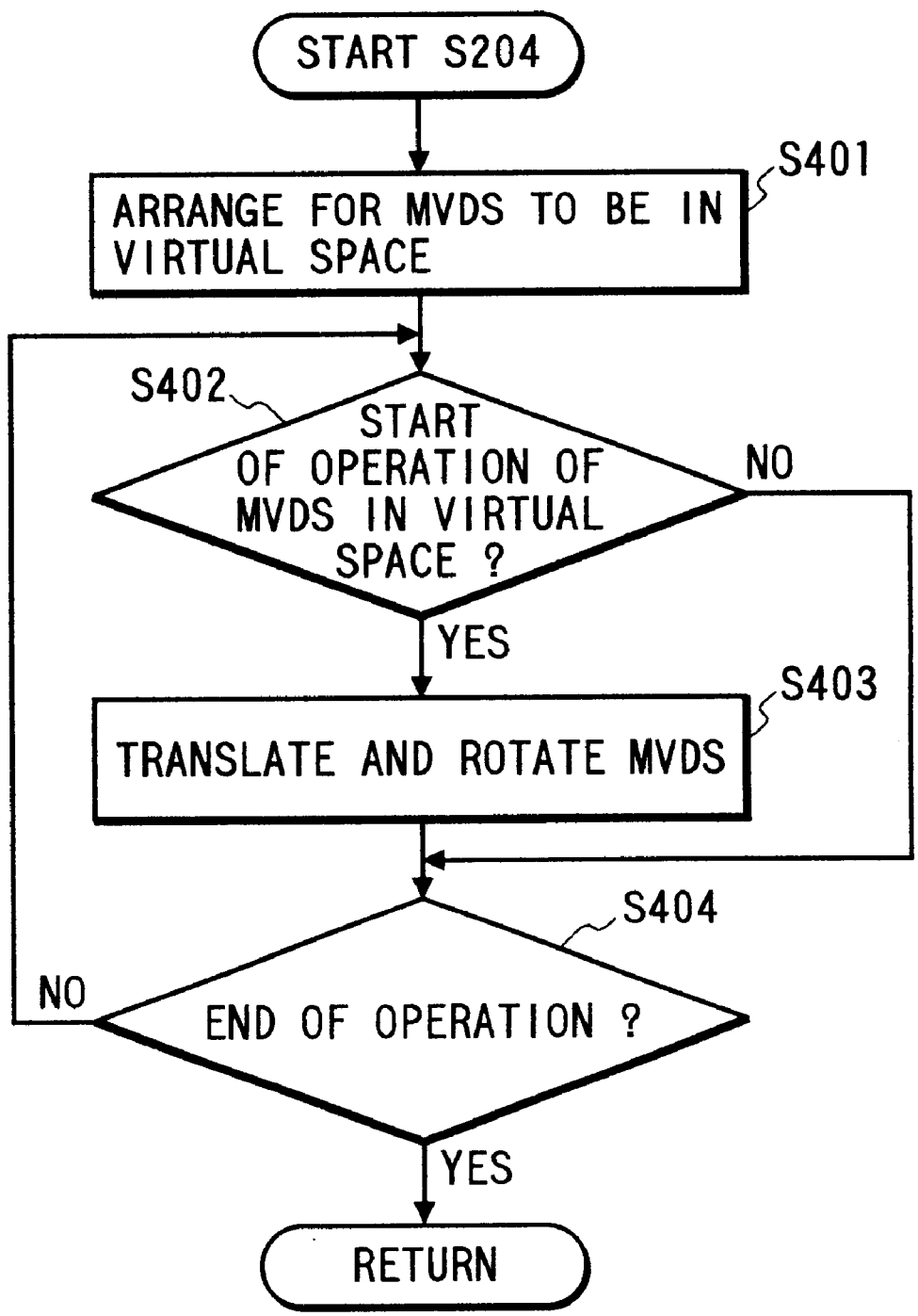
FIG. 4 is a flow chart showing part of the first embodiment.
Figure 17:
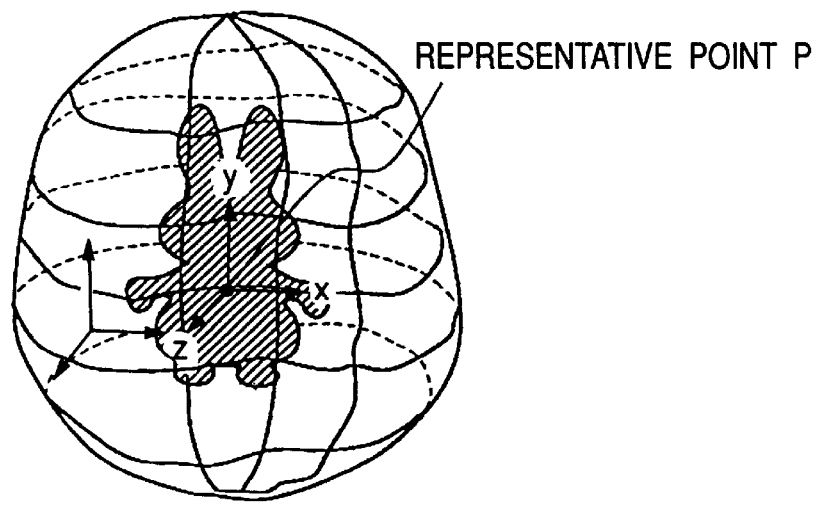
FIG. 17 is a schematic view showing a state wherein a representative point is added to the MVDS.

FIG. 3 shows an example of step S203, and FIG. 4 shows an example of step S204 corresponding to processing in FIG. 3. In step S301, a representative point of the object present in the closed area R is designated (FIG. 17). The representative point is set by designating, e.g., a central point of an area (area having a three-dimensional extent) where the object is present in the closed area R. This point may be designated on the basis of the camera arrangement in photographing the object and the arrangement information in setting the object for the purpose of photographing. Alternatively, the point may be designated from an object in the photographed multi-viewpoint image. In this case, a representative point near the center of the object is designated in the image, and a straight line is obtained in the closed area R by reverse projection of the perspective projection in photographing. This operation is performed for images photographed at a plurality of camera positions. An area where resultant straight lines concentrate is obtained, and the center of gravity of this area is set as the representative point. Any other method may be used. With some method, the representative point of the object in the closed area R is designated.

In step S302, coordinate transformation T for describing the coordinate relationship of the closed area R having the representative point P in the virtual space is prepared. The coordinate transformation T defines the position of the representative point P and the direction of the closed area R viewed from the coordinate system of the virtual space. The coordinate transformation T has parameters for translation, rotation, and reduction. This coordinate transformation T is used in subsequent steps.

Processing in step S204 will be described below with reference to FIG. 4 corresponding to step S204. In step S401, the arrangement position and direction of the MVDS in the virtual space are determined. In addition, components of translation and rotation and the like are described by the coordinate transformation T on the basis of the determined arrangement information. With this processing, the object expressed by the MVDS can be arranged in the virtual space. In step S402, it is determined whether the operation of the MVDS in the virtual space is to be started. In fact, it is assumed that virtual experience is being made while displaying the virtual space. It is determined whether, in this operation, the object expressed by the MVDS is allowed to be gripped and moved. If YES in step S402, the flow advances to step S403. In step S403, the coordinate transformation T is changed and updated on the basis of the operation, thereby translating and rotating the MVDS. If NO in step S402, the flow advances to step S404. It is determined in step S404 whether the operation is to be ended. If YES in step S404, the series of processing is ended. If NO in step S404, the flow returns to step S402.

As the coordinate transformation T used in steps S401 to S404, coordinate transformation from a world coordinate system as a coordinate system where the virtual space is present may be used. Alternatively, the virtual space may be expressed by hierarchical coordinate systems, and coordinate transformation from one of the hierarchical coordinate systems may be used.

In the latter case, elements (coordinate transformation data, shape data, surface characteristic data, illumination, and the like) constituting the virtual space are represented by a tree structure. This is because the space, ground, buildings, rooms, furnitures, illumination, and ornaments, which constitute the three-dimensional space, can be considered to have a hierarchical nesting structure. For example, an ornament placed on a desk moves together with the desk. The arrangement of the ornament depends on the arrangement of the desk. It is convenient to arrange the ornament in the coordinate system of the desk to be relative to the desk. For this reason, these elements have a hierarchical data structure with arrangement dependence. To represent it, the virtual space is represented by an n-ary tree structure.

Figure 9:
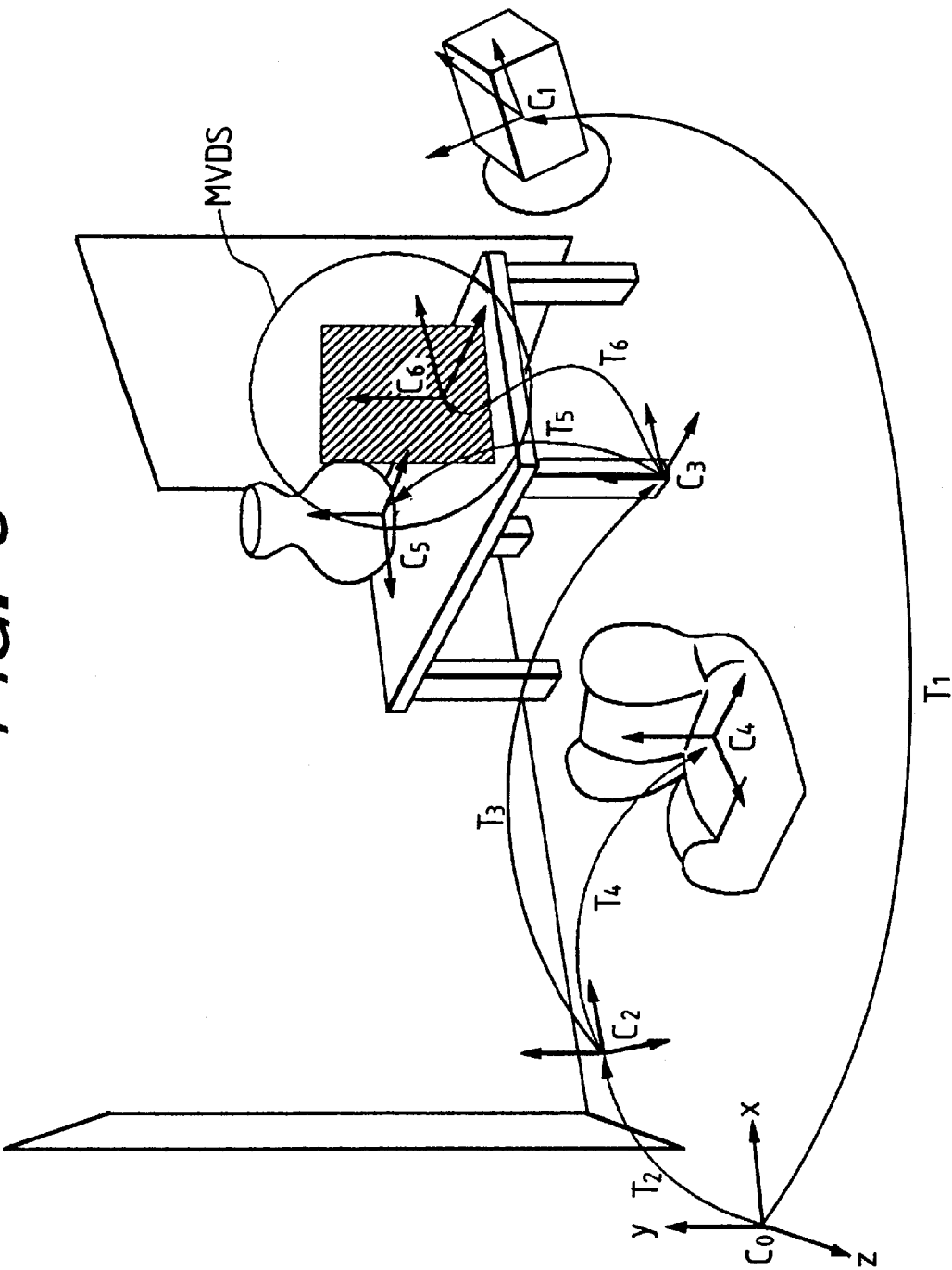
FIG. 9 is a view showing an example of hierarchical coordinate systems in the first embodiment.
Figure 10:
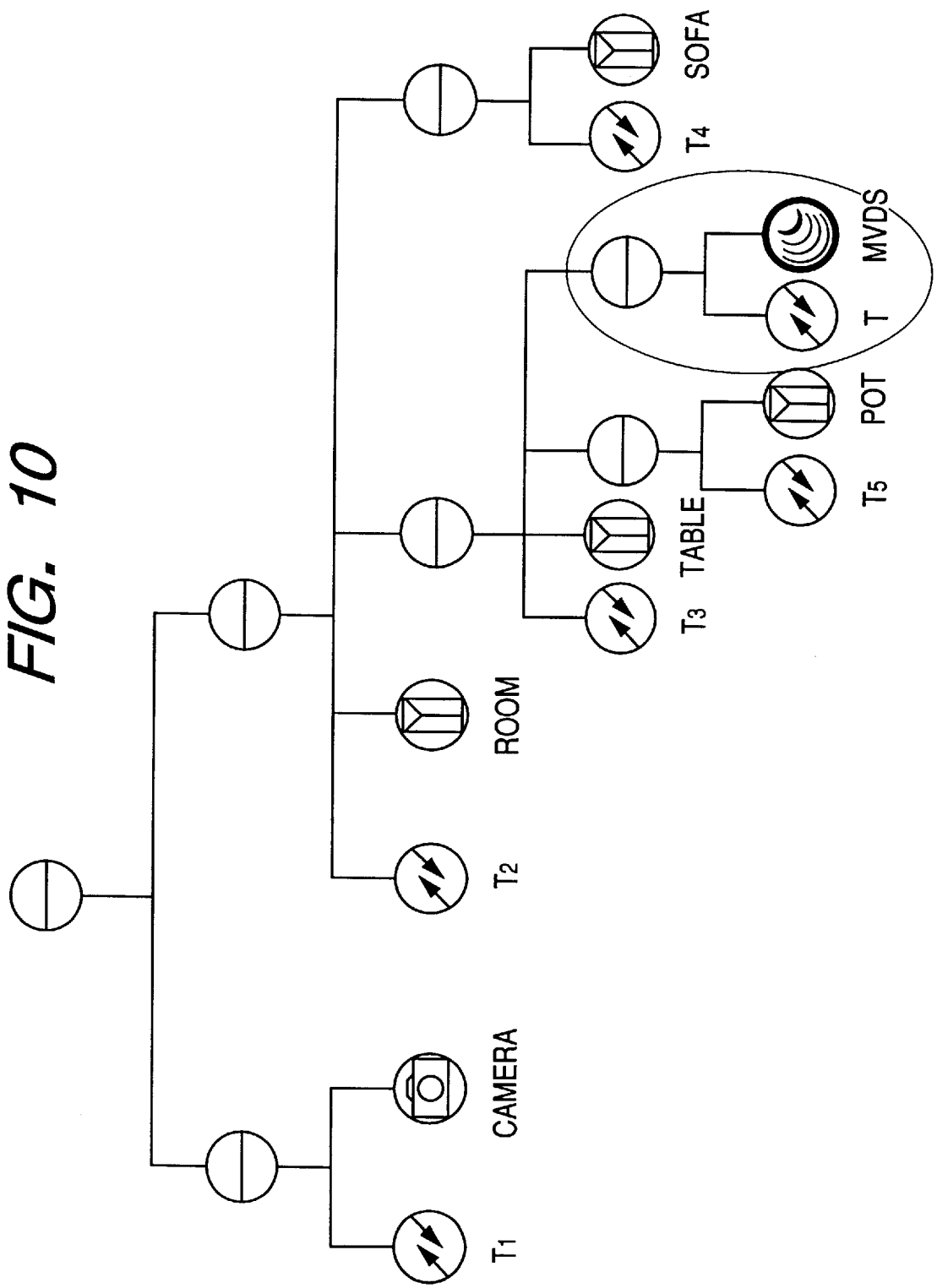
FIG. 10 is a diagram showing the tree structure corresponding to FIG. 9.

FIG. 9 is a view showing a simple example of a virtual space. In FIG. 9, prominence is placed on the room, desk, and sofa in the space. The room is described on a coordinate system C2 transformed from a world coordinate system C0 by coordinate transformation T2. The desk and sofa in the room are described on coordinate systems C3 and C4 transformed from the coordinate system C2 by coordinate transformations T3 and T4, respectively. The pot on the desk is described on a coordinate system C5 transformed from the coordinate system C3 by coordinate transformation T5. In this method, the MVDS is described as one element of this tree structure. In FIG. 9, the MVDS is arranged on the desk. FIG. 10 shows a schematic tree structure representing the virtual space shown in FIG. 9.

With the above method, the object expressed by the MVDS can be arranged and operated in the virtual space. However, since geometric information added to the MVDS is only one representative point, the surface position of the object, and the like are undecided, so the "object" itself cannot be arranged on another object. Consider an MVDS of a vase is placed on the table. In this case, the vase may be arranged in the space such that the vase is "apparently" set on the table as a drawing result. More specifically, when the coordinate transformation T is adjusted while referring to the drawing result, the MVDS can be arranged as if the object were placed on another object. This also applies to translation and rotation. The arrangement or translation and rotation operations can also be automatically performed according to a predetermined procedure.

[Second Embodiment]

Figure 5:
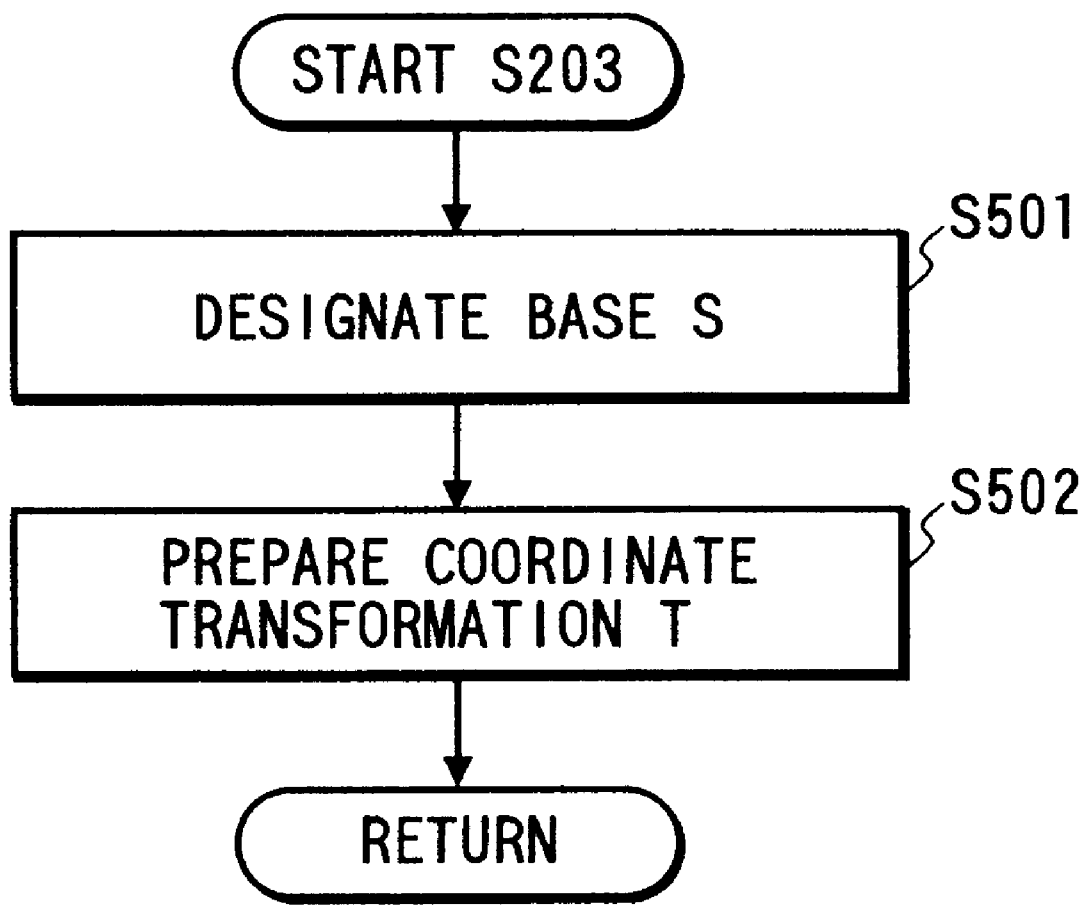
FIG. 5 is a flow chart showing part of the second embodiment.

In the second embodiment, steps S203 and S204 of the first embodiment are changed, as will be described below. Processing in step S203 will be described with reference to FIG. 5, and processing in step S204 will be described with reference to FIG. 6.

Figure 18:
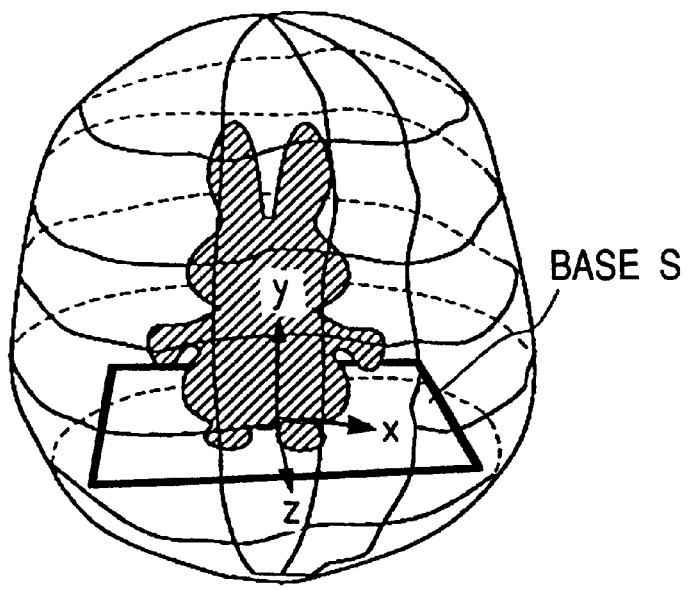
FIG. 18 is a schematic view showing a state wherein a base is added to the MVDS.

In step S501, a base S is designated at a position corresponding to the base of an object present in a closed area R (FIG. 18). The base S is set by designating the lowermost surface of an area (area having a three-dimensional spacial extent) where the object is present in the closed area. In general, the object represented by the MVDS is a natural object, as can be seen from the fact that the object is photographed with a camera, and the object having a base is stable while it is placed on another object. For this reason, it can be considered that designation of the base is often effective in subsequent steps. The base may be designated on the basis of the camera arrangement and the arrangement information of the set table of the object in photographing the object. Alternatively, the base may be designated from an object in the photographed multi-viewpoint image. In this case, a point near the base of the object is designated in the image, and a straight line is obtained in the closed area R by reverse projection of the perspective projection in photographing. This operation is performed for images photographed at a plurality of camera positions, and the base is determined on the basis of the loci of resultant straight lines present in the space. Any other method may be used. With some method, the base S of the object in the closed area R is designated.

In step S502, coordinate transformation T for describing the coordinate relationship of the closed area R having the base S in the virtual space is prepared. The coordinate transformation T defines the position and direction of the base S viewed from the coordinate system of the virtual space. The coordinate transformation T has parameters for translation, rotation, and reduction. This coordinate transformation T is used in subsequent steps.

Figure 6:
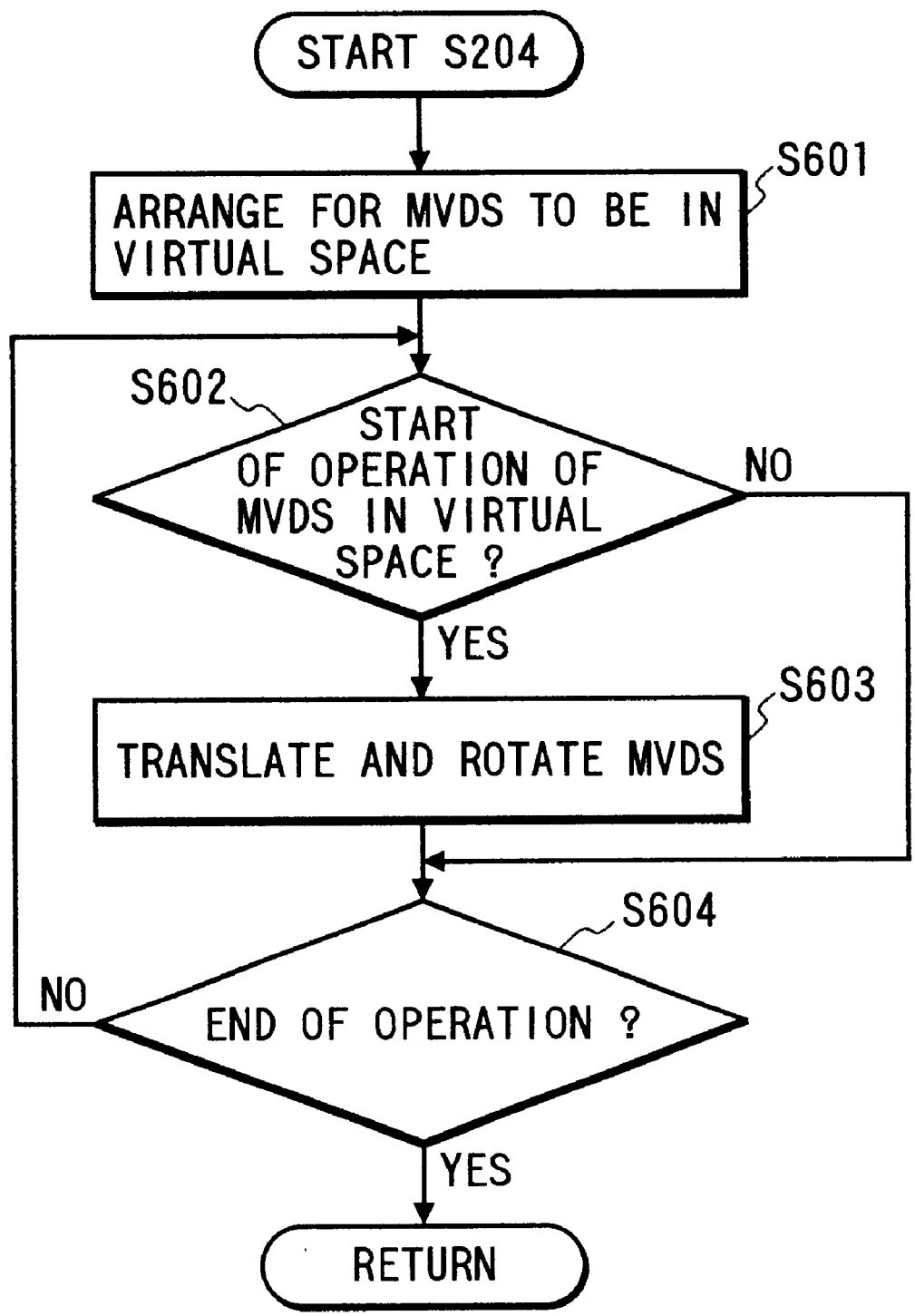
FIG. 6 is a flow chart showing part of the second embodiment.

This processing will be described next with reference to FIG. 6. In step S601, the arrangement position and direction of the MVDS in the virtual space are determined. Since the geometric information of the base S is added to the MVDS, the MVDS can be determined to be set on another object (e.g., the floor or desk) in the virtual space. In addition, components of translation and rotation and the like are described by the coordinate transformation T on the basis of the determined arrangement information. With this processing, the object expressed by the MVDS can be arranged in the virtual space.

In step S602, it is determined whether the operation of the MVDS in the virtual space is to be started. In fact, it is assumed that virtual experience is being made while displaying the virtual space. It is determined whether, in this operation, the object expressed by the MVDS is allowed to be gripped and moved. If YES in step S602, the flow advances to step S603. In step S603, the coordinate transformation T is changed and updated on the basis of the operation, thereby translating and rotating the MVDS. If NO in step S602, the flow advances to step S604. It is determined in step S604 whether the operation is to be ended. If YES in step S604, the series of processing is ended. If NO in step S604, the flow returns to step S602.

With the above method, the object represented by the MVDS can be arranged and operated in the virtual space. Since the base is used as geometric information added to the MVDS, the object expressed by the MVDS can be arranged on another object. This also applies to translation and rotation. An operation restricted on another object is enabled. In addition, the arrangement or translation and rotation operations can also be automatically performed according to a predetermined procedure.

[Third Embodiment]

Figure 7:
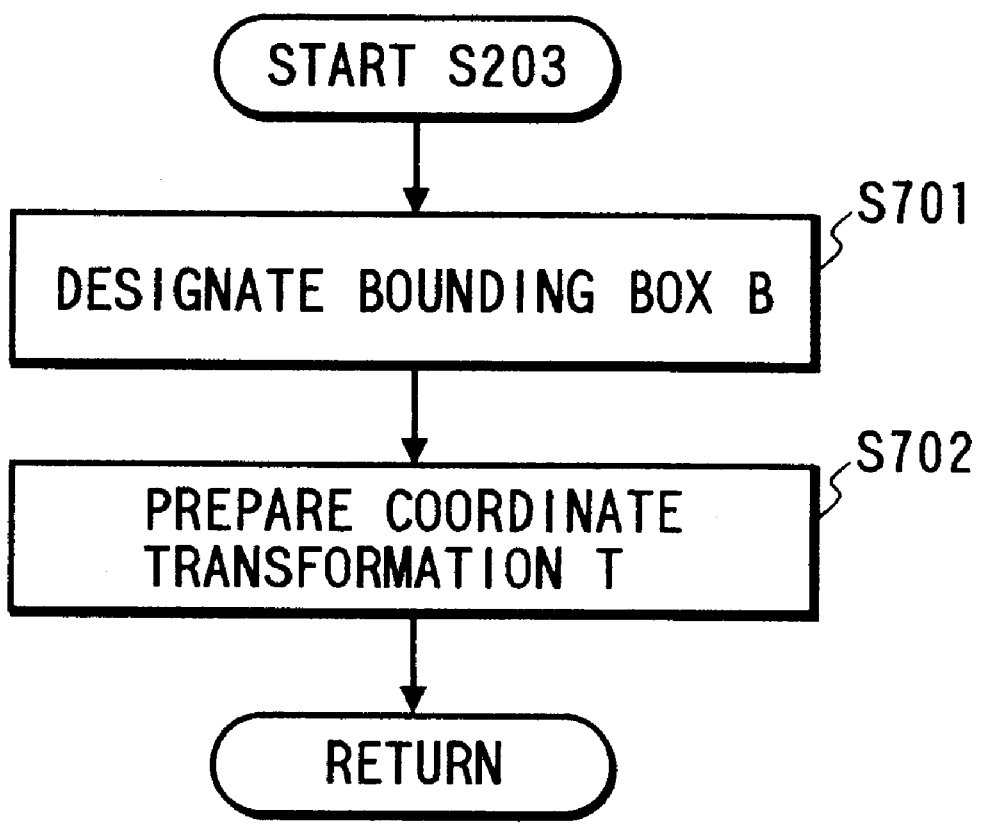
FIG. 7 is a flow chart showing part of the third embodiment.

In the third embodiment, steps S203 and S204 of the first embodiment are changed as will be described below. Processing in step S203 will be described with reference to FIG. 7, and processing in step S204 will be described with reference to FIG. 8.

Figure 19:
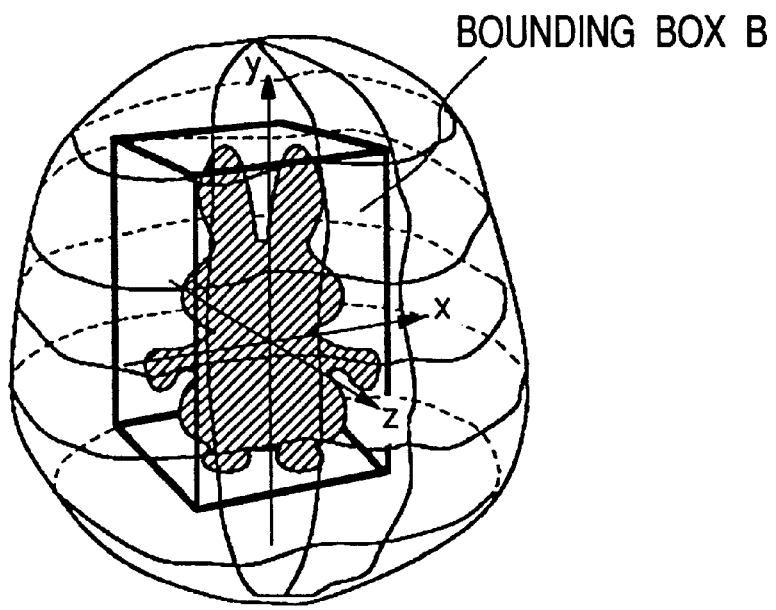
FIG. 19 is a schematic view showing a state wherein a bounding box is added to the MVDS.

In step S701, a bounding box B for limiting the presence area of an object present in a closed area R is designated (FIG. 19). The bounding box B is set by designating an area (area having a three-dimensional spacial extent) where the object is present in the closed area. However, since the shape of the object cannot be perfectly obtained, a rectangular prism approximately representing the presence area of the object, or the like is designated. The bounding box may be designated on the basis of the camera arrangement and the arrangement information of the set table of the object in photographing the object, and the characteristic feature of the photographed multi-viewpoint image. In this method of obtaining the bounding box from the characteristic feature of the photographed multi-viewpoint image, the contour of the image on the image plane is obtained (or designated), and the contour curve is projected on the closed area R by reverse projection of the perspective projection in photographing, This operation is performed for images photographed at a plurality of camera positions, and an area enclosed by planes formed by projecting the contour line is obtained. A rectangular prism enclosing this area is set. Any other method may be used. With some method, the bounding box B of the object in the closed area R is designated.

In step S702, coordinate transformation T for describing the coordinate relationship of the closed area R having the bounding box B in the virtual space is prepared. The coordinate transformation T defines the position and direction of the bounding box B viewed from the coordinate system of the virtual space. The coordinate transformation T has parameters for translation, rotation, and reduction. This coordinate transformation T is used in subsequent steps.

Figure 8:
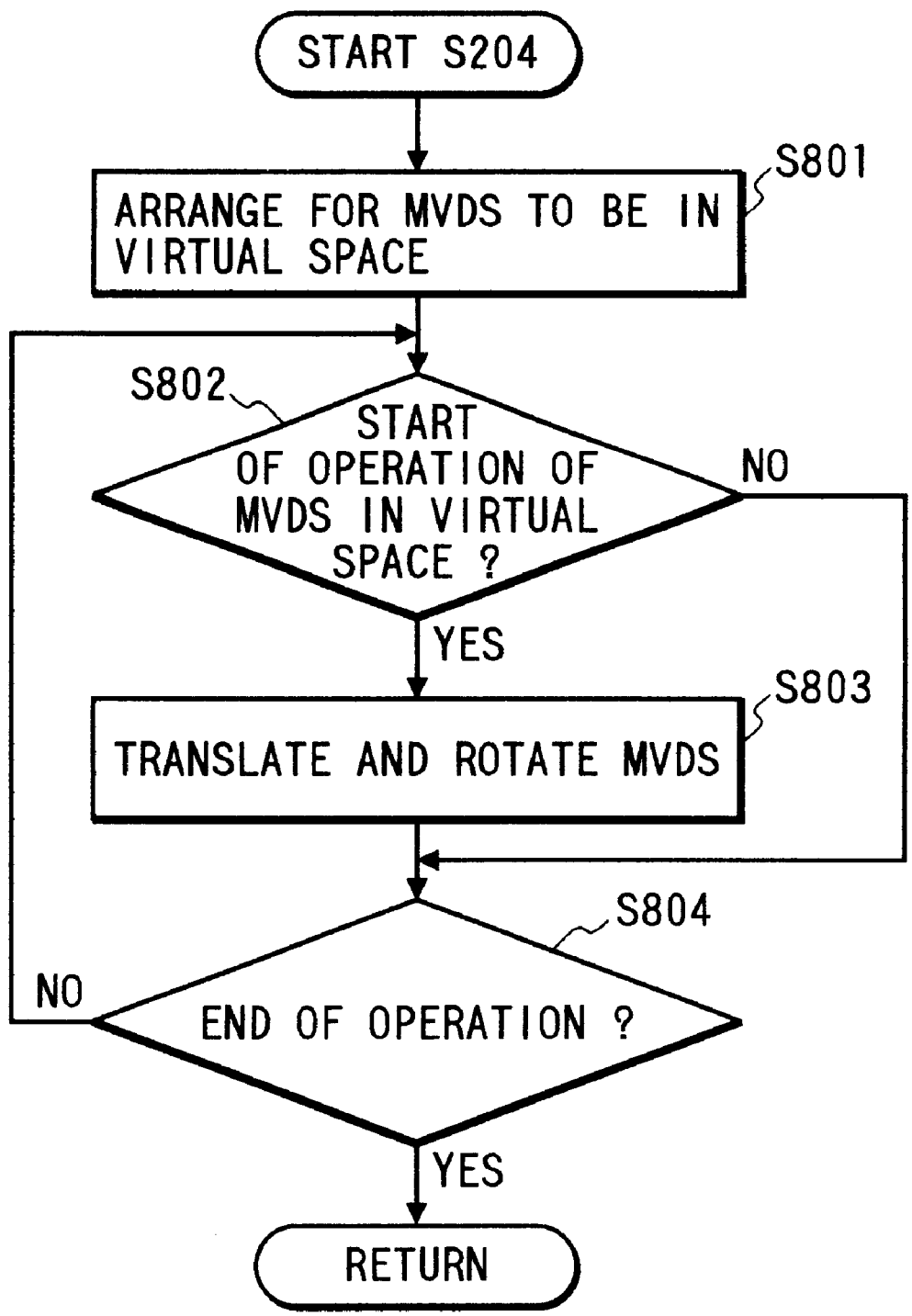
FIG. 8 is a flow chart showing part of the third embodiment.

This processing will be described next with reference to FIG. 8. In step S801, the arrangement position and direction of the MVDS in the virtual space are determined. Since the geometric information of the bounding box B is added to the MVDS, the MVDS can be determined to be set on another object (e.g., the floor or desk) or set while preventing interference with another object in the virtual space. In addition, components of translation and rotation and the like are described by the coordinate transformation T on the basis of the determined arrangement information. With this processing, the object expressed by the MVDS can be arranged in the virtual space.

In step S802, it is determined whether the operation of the MVDS in the virtual space is to be started. In fact, it is assumed that virtual experience is being made while displaying the virtual space. It is determined whether, in this operation, the object expressed by the MVDS is allowed to be gripped and moved. If YES in step S802, the flow advances to step S803. In step S803, the coordinate transformation T is changed and updated on the basis of the operation, thereby translating and rotating the MVDS. If NO in step S802, the flow advances to step S804. It is determined in step S804 whether the operation is to be ended. If YES in step S804, the flow returns to step S204. If NO in step S804, the flow returns to step S802.

With the above method, the object represented by the MVDS can be arranged and operated in the virtual space. Since the bounding box is used as geometric information added to the MVDS, the object expressed by the MVDS can be arranged on another object or arranged while preventing interference with another object. This also applied to translation and rotation. An operation restricted on another object or an operation for preventing rough interference with another object is enabled. In addition, the arrangement or translation and rotation operations can also be automatically performed according to a predetermined procedure.

According to the first to third embodiments, the same effect as that obtained when the shape data of an object having a very complex shape is generated or reproduced can be obtained by expressing the object by nongeometric model data without generating or reproducing the shape data.

In addition, the entire virtual space can be generated without holding an enormous quantity of light space data.

Furthermore, only by adding simple geometric information to the nongeometric model data, an operation in the three-dimensional space can be performed without reconstructing the shape information to express the object.

Furthermore, the object represented by the nongeometric model information can be used in the generated virtual space.

The present invention can be applied to a system constituted by a plurality of devices, or to an apparatus comprising a single device. Furthermore, it goes without saying that the present invention is applicable also to a case where the invention is practiced by supplying a program to a system or apparatus. In this case, the program according to the present invention is loaded from a storage medium to the system or apparatus, thereby operating the system or apparatus in accordance with a predetermined method.

What is claimed is:

1. An image processing method comprising:
    an input step, of inputting a virtual space using a geometric model for forming a virtual environment;
    an acquisition step, of acquiring nongeometric model object expression data based on a multi-viewpoint image;
    an addition step, of adding geometric information to the acquired nongeometric model object expression data;
    a determination step, of determining a relationship between the added geometric information and a coordinate system of the virtual space input is said input step; and
    an operation step, of controlling a variation of the nongeometric model in the virtual space input in said input step by varying the geometric information based on the determined relationship, and of renewing the determined relationship in a case that the nongeometric model object expression data is varied in the virtual space.

2. A method according to claim 1, wherein the added geometric information is a representative point in a closed area where the nongeometric model object expression data is present.

3. A method according to claim 1, wherein the added geometric information is base information in a closed area where the nongeometric model object expression data is present.

4. A method according to claim 1, wherein the added geometric information is a bounding box in a closed area where the nongeometric model object expression data is present.

5. A method according to claim 1, wherein the nongeometric model object expression data is light space data.

6. A method according to claim 1, wherein said operation step further comprises changing the relationship between the geometric information and the coordinate system of the virtual space.

7. A method according to claim 1, wherein said operation step further comprises translating the nongeometric model object expression data in the virtual space.

8. A method according to claim 1, wherein the said operation step further comprises rotating the nongeometric model object expression data in the virtual space.

9. An image processing apparatus comprising:
    an input unit, arranged to input a virtual space using a geometric model for forming a virtual environment;
    an acquisition unit, arranged to acquire nongeometric model object expression data based on a multi-viewpoint image;
    an addition unit, arranged to add geometric information to the acquired nongeometric model object expression data;
    a determination unit, arranged to determine a relationship between the added geometric information and a coordinate system of the virtual space input by said input unit; and
    a controller, arranged to control a variation of the nongeometric model in the virtual space input in said input unit by varying the geometric information based on the determined relationship, and to renew the determined relationship in a case that the nongeometric model object expression data is varied in the virtual space.

10. An apparatus according to claim 9, wherein the added geometric information is a representative point in a closed area where the nongeometric model object expression data is present.

11. An apparatus according to claim 9, wherein the added geometric information is base information in a closed area where the nongeometric model object expression data is present.

12. An apparatus according to claim 9, wherein the added geometric information is a bounding box in a closed area where the nongeometric model object expression data is present.

13. An apparatus according to claim 9, wherein the nongeometric model object expression data is light space data.

14. An apparatus according to claim 9, wherein said controller changes the relationship between the geometric information and the coordinate system of the virtual space.

15. An apparatus according to claim 9, wherein said controller translates the nongeometric model object expression data in the virtual space.

16. An apparatus according to claim 9, wherein said controller rotates the nongeometric model object expression data in the virtual space.

17. A computer-readable storage medium storing a computer program for realizing an image processing method, the program comprising:

program code of an input step of inputting a virtual space using a geometric model for forming a virtual environment;

program code of an acquisition step of acquiring nongeometric model object expression data based on a multi-viewpoint image;

program code of an adding step of adding geometric information to the acquired nongeometric model object expression data;

program code of a determination step of determining a relationship between the added geometric information and a coordinate system of the virtual space input in said input step; and program code of an operation step of controlling a variation of the nongeometric model in the virtual space input in said input step by varying the geometric information based on the determined relationship, and of renewing the determined relationship in a case that the nongeometric model object expression data in the virtual space is varied in the virtual space.

* * * * *

UNITED STATES PATENT AND TRADEMARK OFFICE
CERTIFICATE OF CORRECTION

PATENT NO. : 6,400,373 B1
DATED : June 4, 2002
INVENTOR(S) : Shinji Uchiyama et al.

It is certified that error appears in the above-identified patent and that said Letters Patent is hereby corrected as shown below:

<u>Title page,</u>
Item [*], Notice, insert after "Subject to any ... by 0 days".
-- ¶    This patent issued on a continued prosecution application filed
        under 37 CFR 1.53(d) and is subject to the twenty year patent
        term provisions of 35 U.S.C. 1.54(a)(2). --.

<u>Column 7,</u>
Line 3, "is" should be deleted.

<u>Column 9,</u>
Line 15, "applied" should read -- applies --;
Line 54, "is" should read -- in --.

Signed and Sealed this

Twenty-fifth Day of February, 2003

JAMES E. ROGAN
*Director of the United States Patent and Trademark Office*